United States Patent [19]

Kumar

[11] Patent Number: 5,717,490
[45] Date of Patent: Feb. 10, 1998

[54] METHOD FOR IDENTIFYING ORDER SKIPPING IN SPECTROREFLECTIVE FILM MEASUREMENT EQUIPMENT

[75] Inventor: Kuppam S. Kumar, Sunnyvale, Calif.

[73] Assignee: LSI Logic Corporation, Milpitas, Calif.

[21] Appl. No.: 730,809

[22] Filed: Oct. 17, 1996

[51] Int. Cl.⁶ .................................................. G01B 11/06
[52] U.S. Cl. ........................... 356/381; 356/382; 356/355
[58] Field of Search ................................. 356/381, 382, 356/353, 355, 357

[56] References Cited

U.S. PATENT DOCUMENTS

| | | | |
|---|---|---|---|
| 3,807,870 | 4/1974 | Kalman | 356/382 |
| 4,872,758 | 10/1989 | Miyazaki et al. | 356/381 |
| 4,909,631 | 3/1990 | Tan et al. | 356/357 |
| 4,984,894 | 1/1991 | Kondo | 356/355 |
| 4,999,508 | 3/1991 | Hyakumura | 356/382 |
| 5,018,863 | 5/1991 | Vareille et al. | 356/369 |
| 5,091,320 | 2/1992 | Aspnes et al. | 356/369 |
| 5,311,285 | 5/1994 | Oshige et al. | 356/369 |
| 5,333,049 | 7/1994 | Ledger | 356/355 |
| 5,393,624 | 2/1995 | Ushijima | 356/381 |
| 5,440,141 | 8/1995 | Horie | 356/357 |
| 5,494,697 | 2/1996 | Blayo et al. | 427/10 |
| 5,523,840 | 6/1996 | Nishizawa et al. | 356/357 |
| 5,526,117 | 6/1996 | Wielsch et al. | 356/369 |
| 5,555,472 | 9/1996 | Clapis et al. | 356/355 |
| 5,555,474 | 9/1996 | Ledger | 356/381 |
| 5,604,581 | 2/1997 | Lie et al. | 356/382 |

OTHER PUBLICATIONS

"Overview of Spectroreflectormetry", Technical Brief PMX TB22, V.2, Tencor Instruments, Prometrix Division, Santa Clara, CA, 1 page.

"Goodness of Fit", Applications Bulletin, vol. 2, No. 12, Tencor Instruments, Prometrix Division, Santa Clara, CA, pp. 1–3 (Sep. 1995).

*Primary Examiner*—Frank G. Font
*Assistant Examiner*—Zandra V. Smith
*Attorney, Agent, or Firm*—Marger, Johnson McCollom & Stolowitz, P.C.

[57] ABSTRACT

The present invention describes a method for detecting thickness measurement error of a film mounted on a wafer substrate. The method comprises exposing a film to be measured to electromagnetic waves over a range of incident wavelengths, reflecting the electromagnetic waves from an outer surface of the film and from the film-substrate interface so that said reflected electromagnetic waves interfere with one another, and measuring an intensity of the reflected electromagnetic waves. A reflected intensity curve is then computed over the range of incident wavelengths and then compared to a theoretically calculated reflected intensity curve to obtain a goodness of fit (GOF) measurement. The above process is repeated at a plurality of different locations on the wafer to obtain a plurality of GOF measurements for the wafer. Minimum and maximum GOF measurements are determined from the plurality of GOF measurements obtained. If anyone of these GOF measurements are less than a prescribed amount, such as 0.1, then an order skipping error has been detected. Additionally, if the ratio of the minimum GOF to that of the maximum GOF is less than a predetermined amount, such as 0.6, then an order skipping has been detected and the measurement value should be rejected.

15 Claims, 4 Drawing Sheets

$$\chi_b^2 = \frac{1}{n}\sum_{i=1}^{n}\left[\frac{|R_{exp}(\lambda_i) - R_{calc}(\lambda_i)|^2}{|\delta_R(\lambda_i)|^2}\right] \quad (1)$$

$$\rho = \frac{n\sum xy - \sum y \sum x}{\sqrt{\left(n\sum x^2 - (\sum x)^2\right)\left(n\left\{\sum y^2 - (\sum y)^2\right\}\right)}} \quad (2)$$

$$GOF = \sqrt{1 - \left\{\sum \frac{[R_{exp}(\lambda_i) - R_{calc}(\lambda_i)]^2}{N}\right\}} \quad (3)$$

FIG. 3

METHOD FOR IDENTIFYING ORDER SKIPPING IN SPECTROREFLECTIVE FILM MEASUREMENT EQUIPMENT

BACKGROUND OF THE INVENTION

This invention relates generally to methods for determining the thicknesses of thin films and more particularly to spectroreflective methods used to determine order skipping in semiconductor thin film technology.

Thickness measurements of thin films are accomplished primarily using one of two processes: ellipsometry and spectroreflectometry. In ellipsometry, a sample is exposed to radiation by a linear-polarized laser beam, for which purpose a laser with a polarizer and a compensator is arranged. The laser beam impinges obliquely on the sample, is reflected on its surface and is directed in the form of an elliptically polarized beam to a photo detector via a rotating analyzer. As a rule, the output signals of the photo detector are supplied to a computer for evaluation of the measuring signals. In ellipsometry, the change of the polarization state of the reflected light is measured. The reflection ratio between parallel and vertically polarized light is a function of the layer thickness among others. Such a system is disclosed in U.S. Pat. No. 5,494,697 to Blayo et al.

The advantage of ellipsometry as compared to, for example, photometry consists in that the independent measurement of two parameters, for example thickness and refractive index, is possible in one measuring operation. Furthermore, a rapid measurement of high accuracy is possible.

The disadvantage of simple ellipsometers operating with one wavelength lies in that no spectral information is obtained and that measurement of the layer thickness in only possible within one ellipsometric period. If there is no statement regarding the period, it is also not possible to make a statement regarding the absolute layer thickness.

A further disadvantage lies in that high measuring accuracy depends on the film thickness if the refractive index is unknown. Thus, for instance, when measuring layers of a thickness of approximately 220 to 340 nanometers, an independent measurement of the layer thickness and of the refractive index is not possible.

Spectroreflectometry is a sensitive, non-destructive, optical measurement technique that gibes quantitative information on single layer thin films and multilayer thin film stacks. A typical example is the measurement of $SiO_2$ (silicon dioxide) over TiN (titanium nitride) layer. The advantage of this method is that it does not require sample preparation or a high vacuum environment, and can be used over a thickness range of approximately 20 Å to 400,000 Å, with thickness measurements typically accurate to within one percent.

Spectroreflectometers, such as the PROMETRIX 750, UV 1050 and the UV 1250 made by Tencor, employ normal incidence polychromatic (white and ultraviolet) light to measure reflected light intensity as a function of wavelength. Light reflected from a film surface combines with light reflected from the film-film and film-substrate interferences, resulting in constructive and destructive interference at different wavelengths. The interference produces a characteristic periodic variation in the reflected intensity versus wavelength spectrum. Initial thicknesses and/or reflective index values are estimated from the number and position of the reflectivity extrema. The thickness value and stored refractive index dispersion information are used to calculate a theoretical reflectance spectrum. The thickness is then refined by minimizing the difference between the measured and calculated reflectance spectra.

The PROMETRIX spectroreflectometers further quantify the difference in the measured spectrum and the best-fit theoretical spectrum to merit the quality of the resulting thickness values. This quantification is called the "Goodness of Fit" (GOF).

Spectroreflectometers, such as the PROMETRIX equipment, are well known for order skipping where a system gives a measurement having an error of at least 2000 angstroms. Due to this, problems can arise in Chemical Mechanical Polishing or Planarization (CMP) where polish time is determined by the thickness of the $SiO_2$ to be removed and the removal rate. Semiconductor chip manufacturing has traditionally scrapped a number of product wafers costing thousands of dollars due to over-polishing. Time and again, this over polishing was attributed to the order skipping problem of the PROMETRIX system.

Accordingly, a need remains for a method for accurately determining film thicknesses while avoiding the problem of order skipping errors.

SUMMARY OF THE INVENTION

It is, therefore, an object of the invention to identify film thickness measurements affected by order skipping errors using prior art spectroreflective measuring equipment.

Another object of the invention is to avoid over-polishing by providing accurate thickness measurements for films used in semiconductor technology.

The present invention describes a method for detecting thickness measurement error of a film mounted on a wafer substrate. The method comprises exposing a film to be measured to electromagnetic waves over a range of incident wavelengths, reflecting the electromagnetic waves from an outer surface of the film and from the film-substrate interface so that said reflected electromagnetic waves interfere with one another, and measuring an intensity of the reflected electromagnetic waves. A reflected intensity curve is then computed over the range of incident wavelengths and then compared to a theoretically calculated reflected intensity curve to obtain a goodness of fit (GOF) measurement. The above process is repeated at a plurality of different locations on the wafer to obtain a plurality of GOF measurements for the wafer. Minimum and maximum GOF measurements are determined from the plurality of GOF measurements obtained. If any one of these GOF measurements are less than a prescribed amount, such as 0.1, then an order skipping error has been detected. Additionally, if the ratio of the minimum GOF to that of the maximum GOF is less than a predetermined amount, such as 0.6, then an order skipping has been detected and the measurement value should be rejected.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 3 show equations used in one embodiment (PROMETRIX equipment) to determine the goodness of fit between measured values and theoretical values.

DETAILED DESCRIPTION

Figure 1:
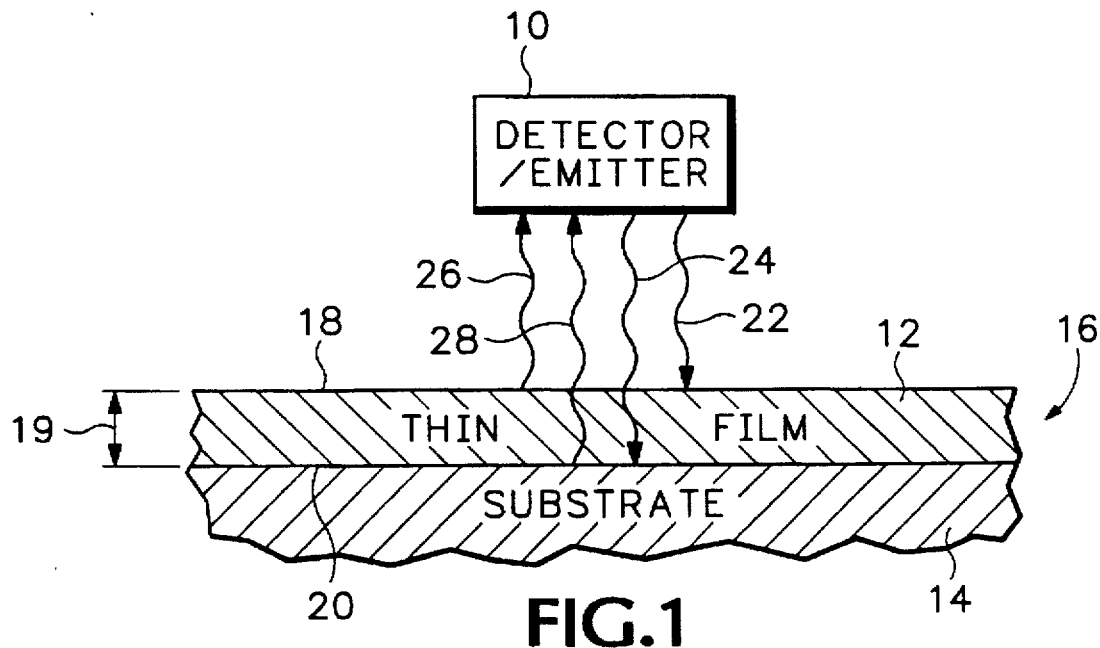
FIG. 1 is a schematic illustration of a spectroreflectometer as used in the present invention.

FIG. 1 shows a spectroreflectometer at 10, incorporating a polychromatic light source emitter and a reflected light detector, in use to measure the thickness of a thin film 12 deposited on a substrate 14. Film 12 is deposited on substrate 14 by any means known in the art, such as chemical vapor deposition (CVD), thereby forming a wafer 16 having a thin film outer surface 18 and a film-substrate interface 20 bounding a thickness 19 of the thin film.

Figure 4:
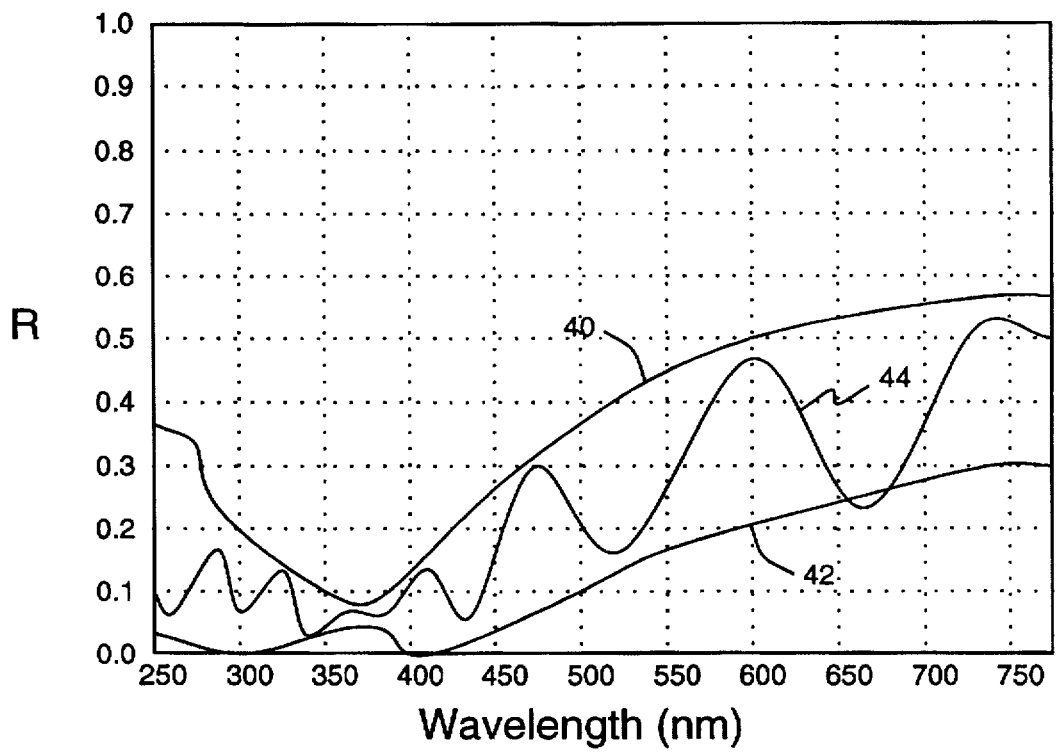
FIG. 4 is a graph showing the reflectance versus wavelength spectrum of a thin film sample using the device of FIG. 1.

Wafer 16 is exposed to electromagnetic waves of known incident intensities, such as light waves 22 and 24 emitted from spectroreflectometer 10, over a range of incident wavelengths. For instance, wafer 16 can be exposed to white and ultraviolet light having a range of incident wavelengths of between 250 nm and 750 nm as shown in FIG. 4. The waves are reflected from the wafer, such as wave 22 from the thin film outer surface 18 and wave 24 from the film-substrate interface 20, to form respective reflective waves 26,28. The intensity of the reflected electromagnetic waves 26,28 are measured, as by spectroreflectometer 10. Because the light path of waves reflected from the film-surface interface 20 travel an additional distance equal to twice the film thickness 19 relative to waves reflected from the thin film outer surface 18, detected waves, such as waves 16,18, interfere with one another in either a constructive or destructive fashion, thus regulating the measured intensity of the reflected electromagnetic waves. From this, a measured reflected intensity curve can be computed over the range of incident wavelengths.

Figure 2:
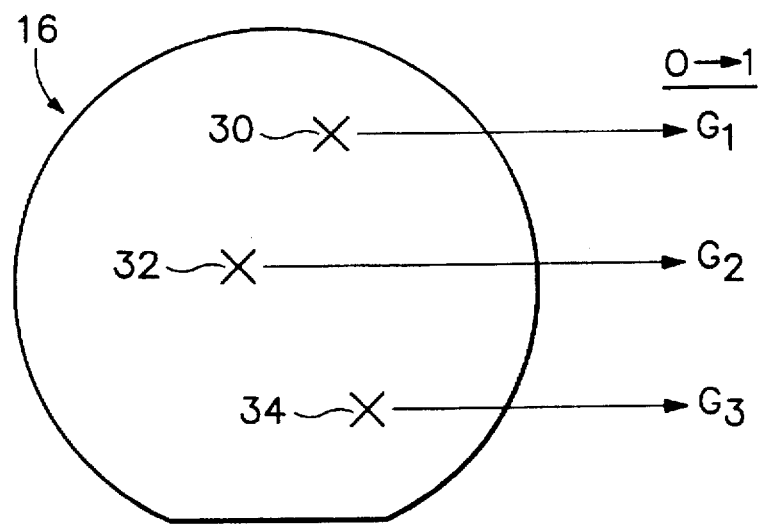
FIG. 2 is a top view representation of a semiconductor wafer showing plural locations at which thin film thicknesses are measured.

These measurements are taken at a plurality of locations on the wafer to gauge the accuracy of the measurements using the methods of the present invention described below. FIG. 2 shows a top view of a wafer at 16. The spectroreflectometer is used to measure the intensity of reflected electromagnetic waves from a plurality of locations on the wafer, such as at 30,32 and 34, to obtain goodness of fit values, $G_1$, $G_2$ and $G_3$ respectively, for each location as by using the methods described below.

FIG. 4 shows such a curve which plots reflectance from an oxide on titanium nitride on aluminum sample. The interference produces a characteristic periodic variation in the reflected intensity versus wavelength spectrum, as shown in line 44 positioned between fit lines 40,42. An initial thickness value is estimated from the number and position of the reflectivity extrema, then calculated by comparing the measured spectrum with a modeled spectrum obtained mathematically by methods known in the art.

The method developed here, incorporates the observation of the parameter, the "goodness of fit" (GOF). The GOF determines how well the measured intensity curve fits with that of the theoretical curve. PROMETRIX works on the basis of spectrometry so that "reflected intensity" can be compared to the "incident intensity".

The GOF is a parameter that is calculated by the equipment, during a particular measurement, such as using the methods described in the Tencor Applications Bulletin, Vol. 2, No. 12 using the equations shown in FIG. 3. The reduced chi-squared method calculates the reflectance difference between the measured ($R_{exp}$) and theoretical ($R_{calc}$) spectra as a function of incident wavelength (lambda$_i$). Equation (1) of FIG. 3 shows a preferred simplified equation used to fit n data points. Portions of the spectrum which have poor reflectivity precision have larger values of $\partial$ in the denominator, thereby lowering their overall contribution. The calculated chi-squared number is the weighted mean difference between measured and calculated values. Poor fits can generate very high values of chi-squared.

Customarily, goodness of fit values used in the industry range between 0 and +1, where +1 represents the best fit. For consistency, and because the GOF value should be constrained for trend purposes, the chi-squared number undergoes a mathematical transformation according to the methods described below.

The correlation coefficient, shown by equation (2) in FIG. 3, is calculated based on how well the wavelength locations of extrema in the reflected intensity curve match up. This value can range between −1 and +1 where x is the measured reflectance, y is calculated reflectance, and n is the number of wavelengths. Minus one indicates that the wavelength locations of the peaks match exactly, but that the spectra are 180° out of phase: the maximums in the experimental spectrum are at the same wavelength locations as the minimums in the theoretical spectrum. Plus one indicates a perfect match.

The GOF for films is preferably calculated to constrain its value to between 0 and 1. For films with less than two extrema in their reflectance spectrum, the GOF is calculated as in equation (3) shown in FIG. 3 where N is the number of data points used in the fit. For thick films, the GOF is calculated as in equation (4) below:

$$GOF_{Thick\ Films} = (\text{Correlation Coefficient } p+1)/2 \quad (4)$$

The goodness of fit (GOF) is a value that represents how well the measured and theoretically calculated reflectance curves match in general: a close march of theoretical and measured spectra indicates a good measurement. A poor fit of the theoretical spectrum to measured spectrum can indicate that the entered optical constraints (e.g., refractive index) are incorrect. Poor fits can also be a result of rough films which scatter light; the presence of another layer, etc. For thin films, it is preferred to use the chi-squared method for determining GOF which shows a sharp maximum value at the correct thickness.

Figure 5:
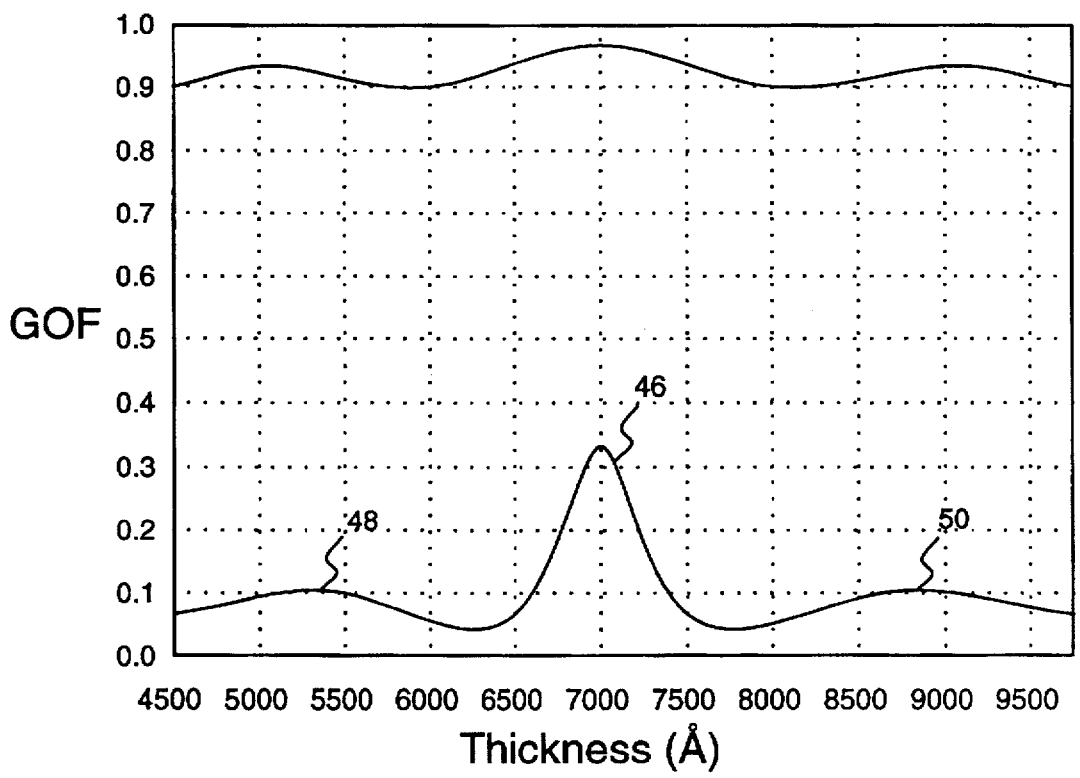
FIG. 5 is a graph showing the goodness of fit (GOF) as a function of the thickness of the thin film using the equations shown in FIG. 3 as applied to the data shown in FIG. 4.

FIG. 5 shows a sample GOF plot of GOF verses possible thicknesses of the film layer showing a peak 46 at 7000 Å and secondary extrema 48,50 at 5300 Å and 8700 Å respectively. Peak 46 has a GOF calculated according to the methods described above as 0.34 while peaks 48,50, showing competing thickness solutions, have GOF values of only around 0.11. The Tencor Bulletin, however, only describes methods used to calculate the GOF parameter and not how the parameter can be effectively applied to eliminate order skipping problems associated with measurements of films; an omission solved by application of the methods of the present invention described below.

Figure 6:
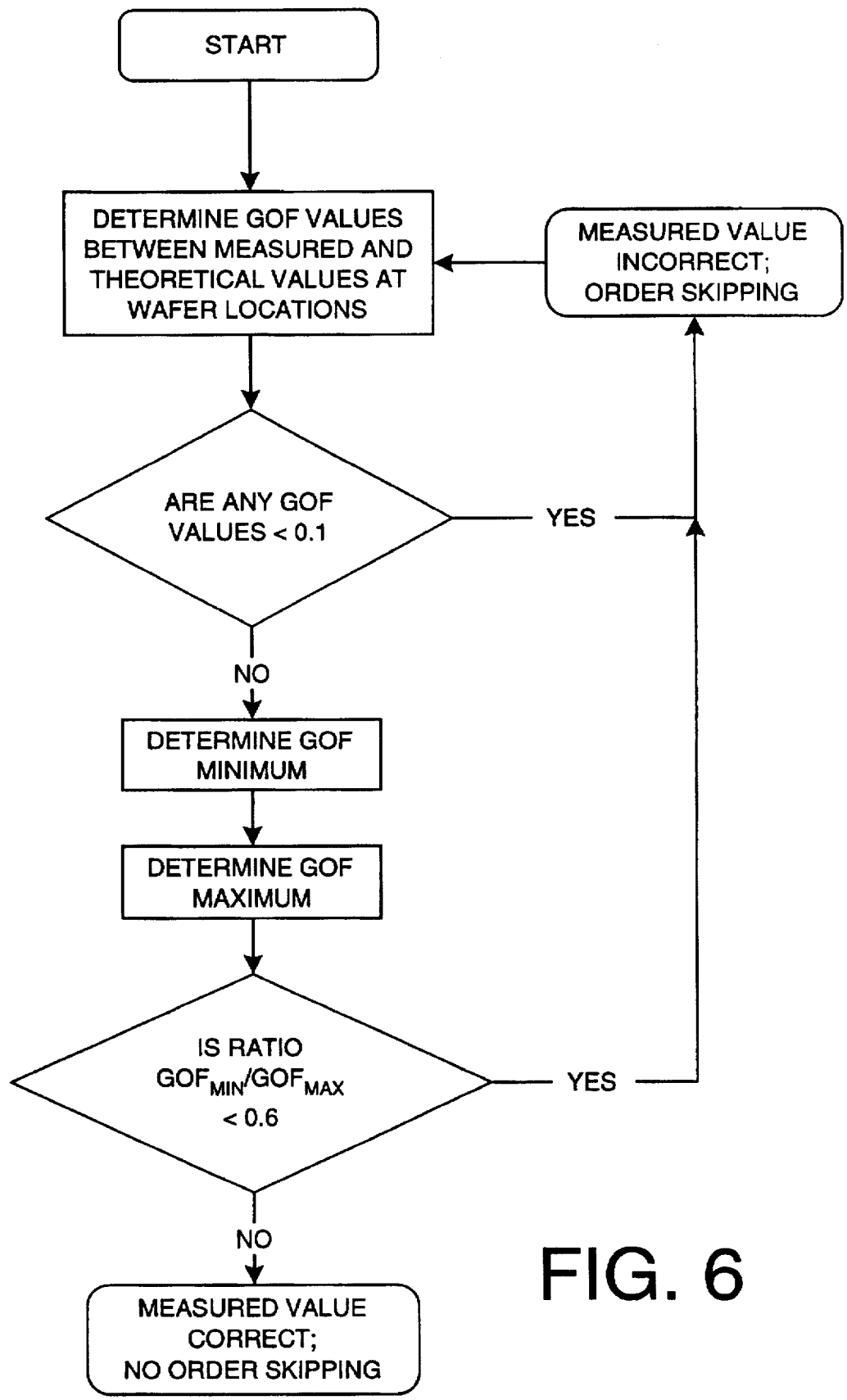
FIG. 6 shows a flow chart diagram of the method for determining measurement error, such as order skipping, according to the present invention.

A preferred embodiment of the present invention utilizes a two test algorithm to utilize this GOF and identify order skipped measurements along the lines described below and shown for a preferred embodiment in FIG. 6. The GOF is determined as above, as by the chi-squared method, to determine the fit of the measure reflected intensity curve to the theoretical reflected intensity curve in order to obtain a GOF measurement from between 0 to 1, such as GOF=0.34 for peak 46 (FIG. 5). Other such GOF values are taken at a plurality of other locations along the wafer and maximum and minimum GOF peak value are determined from all GOF measurements. As a first test, an order skipping measurement error is identified if the ratio of the minimum GOF to that of the maximum GOF is less than a predetermined amount. As a second test, an order skipping measurement error is identified if any of the plurality of GOF measurements are less than a second predetermined amount. If order skipping is determined by application of the above inventive method of integrated circuit manufacture, the original thickness determination is rejected and the wafer is remeasured; otherwise the thickness measurement is accepted as accurate and further polishing can be applied to the wafer, based on the determined initial film thickness, in order to manufacture a film of the desired thickness. Preferably, both of the above tests are used to eliminate measurements unduly affected by order skipping.

Using the PROMETRIX equipment and GOF measurement methods, the ratio of the minimum GOF to that of the maximum GOF, in a particular or given set of values, should be greater than about 0.4, more preferably greater than about 0.6, and most preferably greater than about 0.6. As a second test, the magnitude of all GOF values obtained should be greater than about 0.095, and more preferably greater than about 0.1. This second predetermined amount can be set to a higher value, such as 0.11, in order to further reduce erroneous measurements. A failure of either of these tests identifies an order skipping problem.

Having described and illustrated the principles of the invention in a preferred embodiment thereof, it should be apparent that the invention can be modified in arrangement and detail without departing from such principles. I claim all modifications and variation coming within the spirit and scope of the following claims.

I claim:

1. A method for identifying order skipping in a spectroreflectometric measurement system comprising:

exposing a wafer to be measured to electromagnetic waves over a range of incident wavelengths;

reflecting the electromagnetic waves from the wafer;

measuring an intensity of the reflected electromagnetic waves;

computing a measured reflected intensity curve over the range of incident wavelengths;

determining a theoretical reflected intensity curve over the range of incident wavelengths;

determining the fit of the measured reflected intensity curve to the theoretical reflected intensity curve to obtain a GOF measurement from between 0 and 1; and identifying order skipping if the GOF is less than about 0.1.

2. The method of claim 1, further including:

repeating the above steps at a plurality of different locations on the wafer to obtain a plurality of GOF measurements for the wafer;

determining from the plurality of GOF measurements a minimum GOF;

determining from the plurality of GOF measurements a maximum GOF; and identifying order skipping if the ratio of the minimum GOF to that of the maximum GOF is less than about 0.6.

3. A method for detecting thickness measurement error of a thin film mounted on a substrate comprising:

exposing a thin film to be measured to electromagnetic waves over a range of incident wavelengths;

reflecting the electromagnetic waves from an outer surface of the thin film and from an interface between the thin film and a substrate on which the thin film is mounted so that said reflected electromagnetic waves interfere with one another, said outer surface and said interface bounding a thickness of the thin film;

measuring an intensity of the reflected electromagnetic waves;

computing a measured reflected intensity curve over the range of incident wavelengths;

determining a theoretical reflected intensity curve over the range of incident wavelengths;

determining the fit of the measured reflected intensity curve to the theoretical reflected intensity curve to obtain a GOF measurement;

repeating the above steps at a plurality of different locations on the wafer to obtain a plurality of GOF measurements for the wafer;

determining from the plurality of GOF measurements a minimum GOF;

determining from the plurality of GOF measurements a maximum GOF; and identifying a measurement error if the ratio of the minimum GOF to that of the maximum GOF is less than a predetermined amount or if any of the plurality of GOF measurements are less than a second predetermined amount.

4. The method of claim 3 wherein the predetermined amount is equal to about 0.4.

5. The method of claim 3 wherein the predetermined amount is equal to about 0.5.

6. The method of claim 3 wherein the predetermined amount is equal to about 0.6.

7. The method of claim 3 wherein the second predetermined amount is equal to about 0.095.

8. The method of claim 3 wherein the second predetermined amount is equal to about 0.10.

9. A process for making an integrated circuit comprising:

depositing a film on a substrate;

exposing the film to electromagnetic waves over a range of incident wavelengths;

reflecting the electromagnetic waves from an outer surface of the film and from an interface between the film and the substrate on which the film is deposited so that said reflected electromagnetic waves interfere with one another, said outer surface and said interface bounding a thickness of the film;

measuring an intensity of the reflected electromagnetic waves;

computing a measured reflected intensity curve over the range of incident wavelengths;

determining a theoretical reflected intensity curve over the range of incident wavelengths;

determining the fit of the measured reflected intensity curve to the theoretical reflected intensity curve to obtain a GOF measurement;

determining an initial film thickness from the GOF measurement;

repeating the above steps at a plurality of different locations on the wafer to obtain a plurality of GOF measurements for the wafer;

determining from the plurality of GOF measurements a minimum GOF;

determining from the plurality of GOF measurements a maximum GOF;

identifying a measurement error if the ratio of the minimum GOF to that of the maximum GOF is less than a predetermined amount or if any of the plurality of GOF measurements are less than a second predetermined amount;

repeating the above steps if a measurement error is identified, otherwise polishing the film to a desired thickness based on the determined initial film thickness.

10. The method of claim 9 wherein the predetermined amount is equal to about 0.4.

11. The method of claim 9 wherein the predetermined amount is equal to about 0.5.

12. The method of claim 9 wherein the predetermined amount is equal to about 0.6.

13. The method of claim 9 wherein the second predetermined amount is equal to about 0.095.

14. The method of claim 9 wherein the second predetermined amount is equal to about 0.10.

15. An apparatus for thickness measurement of a sample by spectroreflectometry comprising:

a light beam emitter having a beam path toward said sample;

a light beam detector located along said beam path after said light beam has encountered said sample for outputting a detected intensity of the light beam;

an analyzer coupled to said light beam detector including:
 comparator means for comparing the intensity of the light beam emitted from said emitter with the light beam detected by said detector;
 thickness calculation means for outputting a measured value;
 calculation means for determining a theoretical intensity the light beam detector should detect given known properties of the sample;
 goodness of fit (GOF) calculation means capable of outputting a number representative of the comparison of the theoretical intensity with the measured intensity; and an order skipping identifier coupled to the analyzer for rejecting or accepting the measured value in response to the output number from the goodness of fit calculation means.

* * * * *